No. 744,249. PATENTED NOV. 17, 1903.
E. L. SHORE.
REVERSING GEAR.
APPLICATION FILED DEC. 8, 1902.
NO MODEL. 2 SHEETS—SHEET 1.
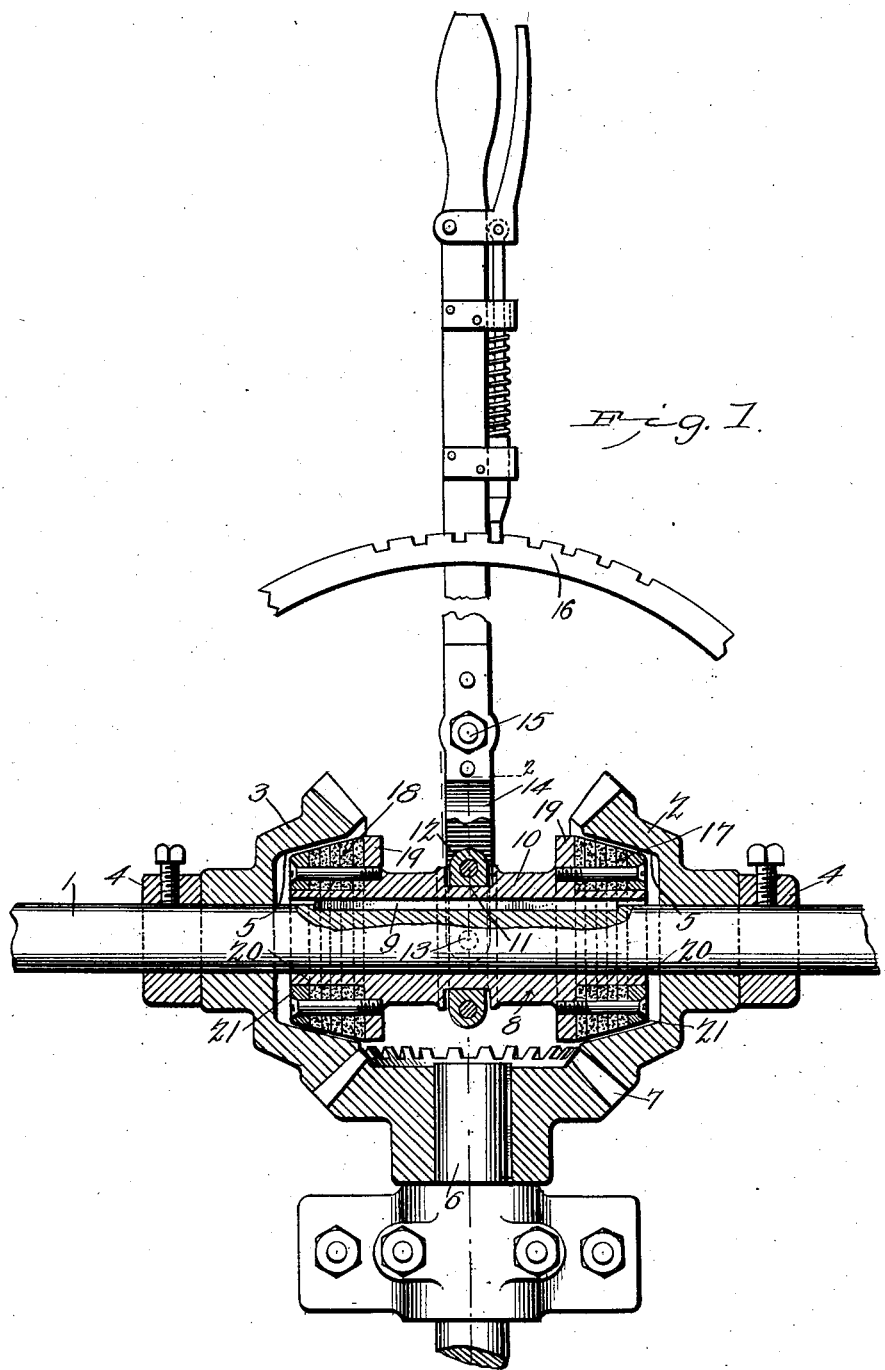

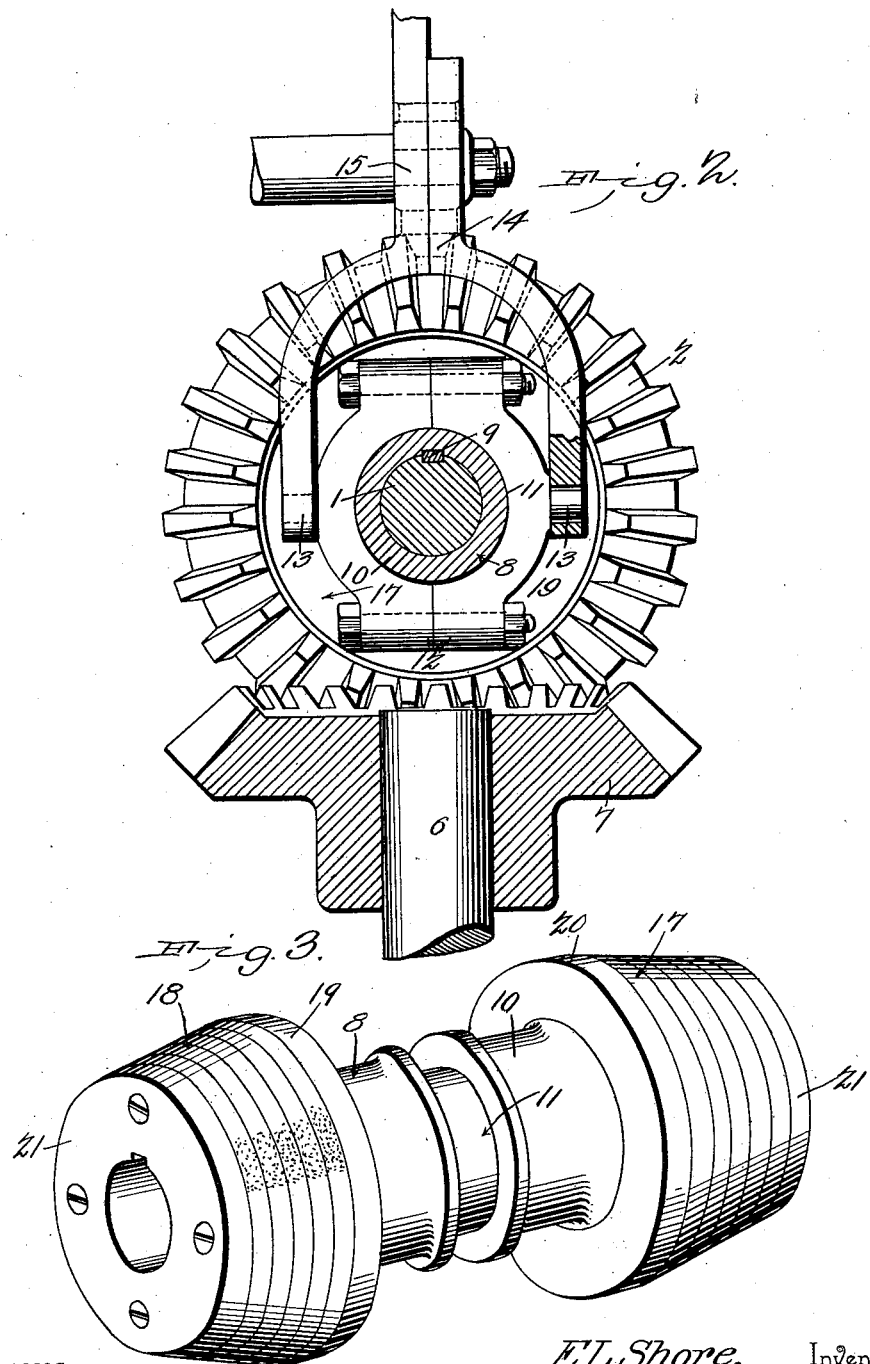

No. 744,249.                                      Patented November 17, 1903.

UNITED STATES PATENT OFFICE.

EDWARD L. SHORE, OF ELDON, IOWA.

REVERSING-GEAR.

SPECIFICATION forming part of Letters Patent No. 744,249, dated November 17, 1903.

Application filed December 8, 1902. Serial No. 134,403. (No model.)

*To all whom it may concern:*

Be it known that I, EDWARD L. SHORE, a citizen of the United States, residing at Eldon, in the county of Wapello and State of Iowa, have invented a new and useful Reversing-Gear, of which the following is a specification.

My invention relates to reversing-gear, and has for its object to produce a mechanism of this character in which the direction of rotation of a driven shaft may be instantaneously changed by means of improved mechanism mounted upon a drive-shaft situated at right angles to the driven shaft.

The invention comprises the details of construction and combination of parts more fully hereinafter described.

In the accompanying drawings, Figure 1 is a vertical longitudinal sectional elevation of my improved mechanism. Fig. 2 is a vertical transverse section on the line 2 2 of Fig. 1. Fig. 3 is a perspective view of the clutch member removed.

Referring to the drawings, 1 indicates a drive-shaft operated from any suitable source of power and having mounted idly thereon bevel-gears 2 and 3, having fixed collars 4 mounted upon the shaft at their outer faces, these collars being held in place in any suitable manner, such as by screws or the like. The gears 2 and 3 each has formed in its inner face a beveled recess 5, formed by coring out the metal of the gear or in other suitable manner.

6 is the driven shaft, having keyed thereon a bevel-gear 7, which is in mesh with the gears 2 and 3 on the drive-shaft and adapted to receive motion from either of them in the manner and for the purpose to be presently explained.

8 indicates a clutch member mounted on the shaft 1 between the idle gears 2 and 3. This member is fixed to the shaft for rotation by a suitable spline or feather 9, but is adapted for movement longitudinally of the shaft in order that it may engage either of the gears 2 or 3. This friction member comprises a body portion 10, having a transverse peripheral groove 11 formed therein and adapted to receive a removable collar 12, formed in two sections, secured together by suitable bolts or the like. The collar has formed on its edges at points diametrically opposite two integral lugs 13, adapted to be engaged by orifices in the lower bifurcated end of a lever 14. This lever is pivoted, as at 15, and is provided at its upper end with a spring-pawl adapted to engage teeth in a rack 16 for holding the clutch member in any desired position. The clutch member is further provided with two enlarged heads 17 and 18, beveled to conform to the beveled recess 5, formed in the faces of the gears 2 and 3 and into which they project. These heads are constructed by forming on the body of the clutch member fixed flanges 19, projecting at right angles thereto, and a reduced core 20, which extends outward therefrom. Upon the core 20 is mounted the friction material—such as leather, rubber, or the like—the outer ends of the core having applied thereto removable disks 21, which serve to hold the friction material in place and protect its outer face. These disks are secured to the flanges 19 by means of screws or the like, which also pass through the friction material.

In operation power being applied to the drive-shaft 1 it will rotate in one direction, carrying with it the clutch member 8, the gears 2 and 3 remaining idle. Now if the lever be moved to the right it will force the head 17 of the friction member into the beveled recess of the gear 2, thus frictionally clutching the gear and driving it with the shaft, and this gear being in mesh with the gear 7, fixed on the driven shaft 6, will impart motion to such shaft in one direction, the gear 3, which is also in mesh with the gear 7, in the meantime moving idly on the drive-shaft. Now if the lever be moved to the left it will release the gear 2 and cause the head 18 of the clutch member to frictionally engage and hold the gear 3, driving the same with the shaft 1 and through it imparting motion to shaft 6 through the medium of fixed gear 7, thus driving shaft 6 in the opposite direction.

It will be seen from this construction that I produce a reversing mechanism in which the direction of rotation of the driven shaft may be instantly changed, and this by means of mechanism mounted upon a drive-shaft which stands at right angles thereto. It will also be seen that I produce an improved clutch member admirably adapted for the purposes herein explained.

Having thus fully described my invention, what I claim as new, and desire to secure by Letters Patent, is—

The combination with a clutch member comprising a body portion provided with a peripheral groove, of friction-heads provided at opposite ends of the body portion, each head consisting of a lateral flange formed integral with the body, a reduced core projecting from the flange parallel with the body, friction material mounted on the core and a protecting-disk applied to the end of the core over the friction material and secured to the lateral flange by bolts or the like passing through the frictional material, a removable split collar mounted in the groove and having lugs formed thereon, and an operating-lever having its end bifurcated to straddle the collar and operatively engaging the lugs.

In testimony that I claim the foregoing as my own I have hereto affixed my signature in the presence of two witnesses.

EDWARD L. SHORE.

Witnesses:
J. H. R. SPILMAN,
R. F. HICKMAN.